Figure 1:
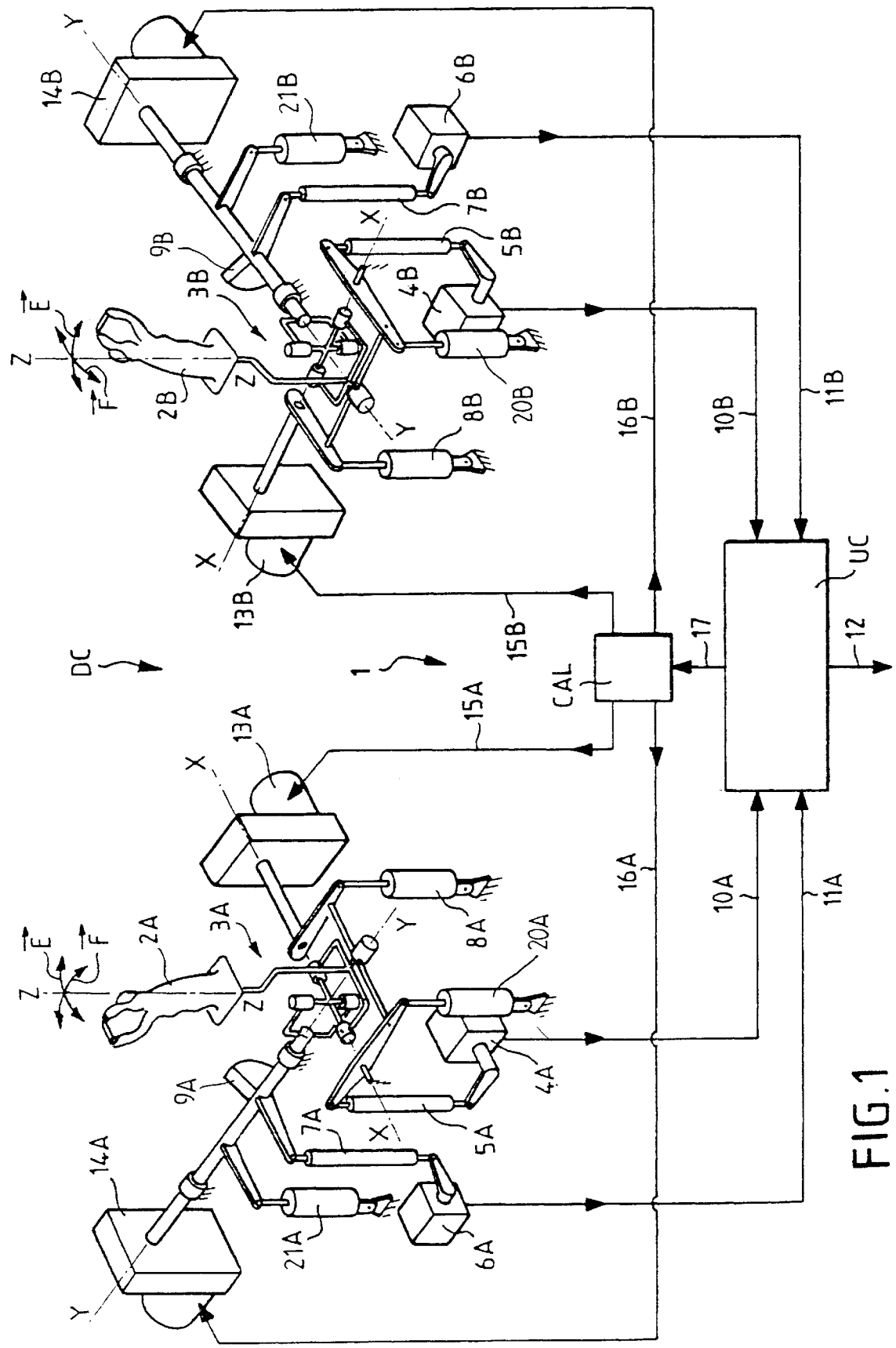

United States Patent [19]
Gautier et al.

[11] Patent Number: 5,900,710
[45] Date of Patent: May 4, 1999

[54] SYSTEM FOR COUPLING CONTROL COLUMNS

[75] Inventors: Jean-Pierre Gautier, Toulouse; Michel Todeschi, Colomiers, both of France

[73] Assignee: Aerospatiale Societe Nationale Industrielle, Paris, France

[21] Appl. No.: 08/976,479

[22] Filed: Nov. 24, 1997

[30] Foreign Application Priority Data

Nov. 22, 1996 [FR] France .................................. 96 14289

[51] Int. Cl.⁶ .......................... G05B 11/01; B64C 13/50
[52] U.S. Cl. ......................... 318/675; 318/564; 318/628; 318/676; 244/223; 244/228
[58] Field of Search .................................. 244/220, 221, 244/223, 228, 229; 318/563, 564, 562, 584–586, 625, 628, 45, 85, 675, 676

[56] References Cited

U.S. PATENT DOCUMENTS

| | | | |
|---|---|---|---|
| 4,056,763 | 11/1977 | Debrie et al. ............................ | 318/675 |
| 4,106,728 | 8/1978 | Griffith .................................... | 244/223 |
| 4,510,574 | 4/1985 | Guittet et al. ............................. | 395/95 |
| 4,671,166 | 6/1987 | Glaze et al. .............................. | 91/361 |
| 4,688,443 | 8/1987 | Fabre et al. .. | |
| 4,793,576 | 12/1988 | Frerk ...................................... | 244/228 |
| 5,002,241 | 3/1991 | Tizac . | |
| 5,125,602 | 6/1992 | Vauvelle . | |
| 5,149,023 | 9/1992 | Sakurai et al. .......................... | 244/229 |
| 5,291,113 | 3/1994 | Hegg et al. .. | |
| 5,412,299 | 5/1995 | Gregory et al. ......................... | 318/628 |
| 5,456,428 | 10/1995 | Hegg ..................................... | 244/229 |
| 5,473,235 | 12/1995 | Lance et al. ............................. | 318/561 |
| 5,489,830 | 2/1996 | Fernandez ............................... | 318/628 |
| 5,694,014 | 12/1997 | Hegg et al. .............................. | 318/564 |

FOREIGN PATENT DOCUMENTS

| | | |
|---|---|---|
| 0204598 | 12/1986 | European Pat. Off. . |
| 0383663 | 8/1990 | European Pat. Off. . |
| 0384806 | 8/1990 | European Pat. Off. . |
| 0659639 | 6/1995 | European Pat. Off. . |

OTHER PUBLICATIONS

J. W. Hegg et al., "Features of Active Sidestick Controllers," Digital Avionics Systems Conference, Phoenix, Oct. 30–Nov. 3, 1994, No. CONF. 13, Institute of Electrical and Electronics Engineers, Oct. 30, 1994, pp. 305–308, XP000512886.

J. W. Hegg et al., "Sidestick Controllers for Advanced Aircraft Cockpits," Scientific Honeyweller, Jan. 1, 1993, pp. 70–77, XP000429070.

*Primary Examiner*—Brian Sircus
*Attorney, Agent, or Firm*—Stevens, Davis, Miller & Mosher, L.L.P.

[57] ABSTRACT

The present invention relates to a system for coupling at least two control columns (2A, 2B) of a control device (DC) of a machine, especially an aircraft. The coupling system includes for each of the columns (2A, 2B), at least one operating member (13A, 13B, 14A, 14B) capable of making the column (2A, 2B) tilt about an axis, and a calculation unit (CAL) receiving information relating to the position of tilt of the columns (2A, 2B) and generating, when at least one of the columns (2A, 2B) is operated, tilt commands which are transmitted to the operating member (13A, 13B, 14A, 14B) of the other column (2A, 2B).

14 Claims, 2 Drawing Sheets

SYSTEM FOR COUPLING CONTROL COLUMNS

The present invention relates to a system for coupling at least two control columns of a control device of a machine.

Although not exclusively, it is more particularly applicable to control devices for aircraft and will be described hereafter more particularly with reference to an application of this kind, it being clearly understood that this must not in any way restrict the scope of the invention.

It is known that many machines, such as airplanes, helicopters, battle tanks, civil engineering work plants, etc., have a series of controlled elements that can be operated from one or other of two twin command stations, controlled by two separate operators (known as the driver and co-driver in the case of land vehicles and as the pilot and co-pilot in the case of airborne vehicles) each equipped with a control column articulated so that it can be tilted about at least one axis of tilting.

Various solutions for coupling control columns are known.

A first series of known solutions recommends the use of mechanical systems such as those described, for example, in the documents U.S. Pat. No. 5,137,234 and WO-95/03212.

However, such mechanical coupling solutions have a great many drawbacks, especially as regards the mass, size and maintenance.

Another kind of solution is described in the document EP-0 384 806, which discloses a control column which has an electric motor but on the one hand allows the creation of a force sensation and, on the other hand, when two columns of this type are associated with one another, allows the tilting of one column to be mimicked by the other.

An electrical coupling system of this kind, which makes it possible to overcome some of the drawbacks of mechanical coupling, does however have a major drawback, namely the fact that a breakdown in said electrical system means that force sensation, and particularly the re-centering of the control columns to a neutral position when these columns are not being operated is lost. A drawback of this kind would not be acceptable without special precautions, particularly for a civil transport airplane.

So, to use a solution of this kind, for example, on a civil transport airplane would lead to the imposition of a great many stipulations, as regards said coupling system and especially the amount of redundancy and the reliability of the elements making it, so that the safety of said airplane is not affected.

The purpose of the present invention is to overcome these drawbacks. The invention relates to a system for coupling at least two control columns which can be produced simply and with a small size and can form particularly effective coupling, with the possibility for easy deactivation.

To achieve this, according to the invention, said system for electrically coupling at least two control columns of a control device of a machine, said control columns being intended to be operated by separate operators and each being mounted so that it can tilt about at least one axis of tilting, said electrical coupling system comprising:

for each of said control columns, at least one tilt sensor delivering an electrical signal that is a function of the amplitude of tilting of said control column about its axis of tilting on either side of a neutral position;

for each of said control columns, at least one operating member capable of acting, in accordance with commands received electrically, on said control column; and calculation means receiving the electrical signals generated by said tilt sensors and capable of sending electrically, on the basis of said electrical signals, on the one hand, commands to control members of the machine and, on the other hand, commands to said operating members, is noteworthy in that, for each of said control columns there is also at least one mechanical or hydraulic means generating resistance to tilting when said control column is tilted, the amount of resistance being a function of the amplitude of said tilting, so as to produce a force sensation function, in that said calculation means can be activated and deactivated for generating the commands for said operating members, in that said operating members are commanded only when said calculation means are activated, and in that the commands for one operating member associated with one of said control columns always depend on the tilted position of the other control column so that the force sensation function and the function of coupling the control columns are separate, the force sensation function being achieved purely mechanically by the action of said mechanical or hydraulic means and the coupling function being achieved electrically by the action of said operating members.

Thus, by virtue of the invention a particularly effective "active" coupling system as specified hereinbelow is obtained.

In addition, said coupling system can easily be deactivated either manually by one of the operators or automatically by an appropriate device, especially by deactivating said calculation unit.

Furthermore, in the event of a breakdown in the coupling system in accordance with the invention, which work electrically, the force sensation created by said mechanical or hydraulic means that generate resistance to tilting is maintained, because said mechanical means are independent of said coupling system, unlike the known and aforementioned solution in document EP-0 384 806. Also, the coupling system in accordance with the invention can be produced simply with few redundancies.

Advantageously, when just one of said control columns is operated, in a first position of tilting, the operating member (for example an electric motor or a geared motor unit), of the other control column is commanded to bring this operating member into a second position of tilting, the amplitude of tilting of which is equal to the amplitude of tilting of said first tilted position, multiplied by a determined coefficient.

Furthermore, when said control columns are operated simultaneously, the present invention can be implemented in two different alternative ways.

In a first alternative, each operating member is commanded so that a resistance to the tilting, with a value that is a function of the amplitude of tilting of the other control column is generated in the associated control column. Thus, although the control columns can be tilted independently, the operators are informed, by the resistance to tilting, of any simultaneous operation.

In a second alternative, said operating members are commanded in such a way as to bring said control columns into identical positions of tilting, the amplitude of tilting of which is a function of the respective forces applied by the operators to said control columns, which makes it possible to obtain identical controlled tilting.

In this second alternative, the coupling system in accordance with the invention preferably comprises, for each of said control columns at least one load sensor capable of measuring the force applied by one operator to said control column, and said coupling system is deactivated when the force applied to one of said control columns exceeds a predefined value.

According to the invention, said calculation unit receives information relating to the position of tilt of the control columns, in a first alternative directly from said tilt sensors and, in a second alternative, from said central unit.

In the latter case, the calculation unit is preferably incorporated into said central unit.

Furthermore, the coupling system in accordance with the invention may also have a damping function.

For this, in a first embodiment, said coupling system has at least one speed sensor associated with one of said control columns and capable of measuring the rate of tilt of said control column; and the operating member associated with said control column is commanded, when it tilts, in such a way as to generate resistance to tilting, the value of this resistance being a function of the rate of tilt measured by said speed sensor.

In a second embodiment, at least one independent damping means, for example a hydraulic damper, associated with one of said control columns is provided.

Of course, it is also envisageable to achieve damping by using said aforementioned first and second embodiments simultaneously.

It will be noted that the coupling system can also be applied to a machine, especially an aircraft, that can be controlled by an automatic pilot.

In this case, according to the invention, said coupling system comprises:

in a first alternative, priority-action means which keep the control columns in a determined set position, for example a neutral position, when said machine is being controlled by said automatic pilot; and in a second alternative, means which, when said machine is being controlled by said automatic pilot, make said control columns follow the tilting with amplitude that corresponds to said control.

The figures of the appended drawing will make it easy to understand how the invention can be achieved. In these figures, identical references denote similar elements.

FIG. 1 diagrammatically illustrates a coupling system in accordance with the invention, in a first embodiment.

Figure 2:
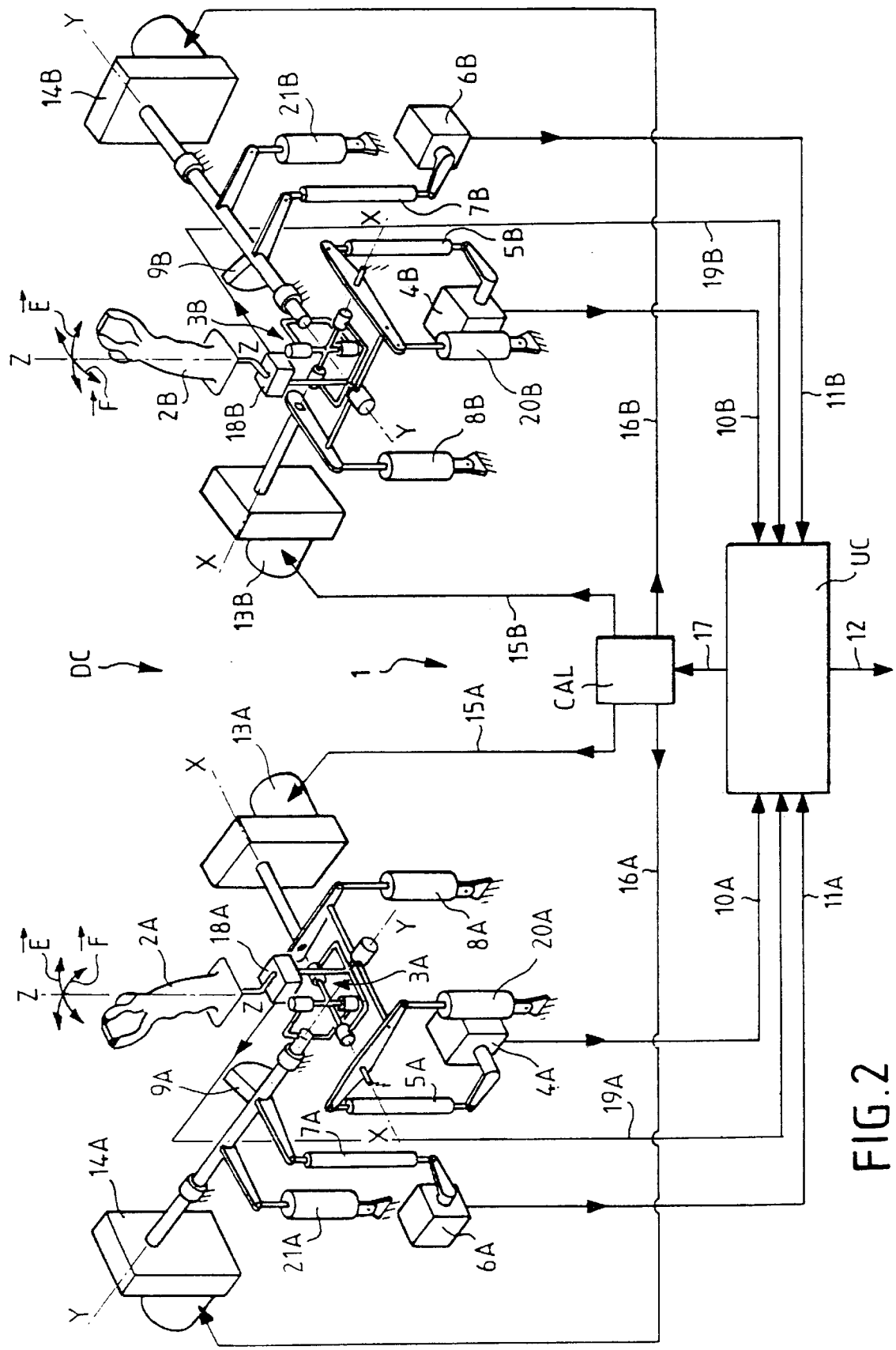

FIG. 2 diagrammatically illustrates a coupling system in accordance with the invention, in a second embodiment.

The coupling system 1 in accordance with the invention is depicted diagrammatically in FIGS. 1 and 2, in two different embodiments respectively, is intended for coupling control columns 2A and 2B of a control device DC of a machine, in this case an aircraft, for example a civil transport airplane.

In a known way, said control columns 2A and 2B are produced in the form of grips that can be operated by hand, by the aircraft pilot and co-pilot respectively.

For the pitch and roll control of said aircraft, said control columns 2A and 2B which when in the neutral position or position of rest are oriented longitudinally along an axis Z—Z, can be maneuvered:

on the one hand, forward and back, as indicated by a double-headed arrow F, so as to tilt about a transverse axis X—X which allows the pitching of the aircraft to be controlled; and on the other hand, to the right and to the left, as indicated by a double-headed arrow E, so as to tilt about a longitudinal axis Y—Y, which allows the rolling of the aircraft to be controlled.

It will be noted that said control device DC comprises identical elements associated respectively with said control columns 2A and 2B described hereinabove. To simplify the description, the elements which are identical will be denoted by the same number, followed either by the letter A or by the letter B, according to whether said elements are associated with the column 2A or with the column 2B.

As is known, said control device DC comprises, in addition to said control columns 2A and 2B:

a mechanism 3A or 3B comprising an articulation, for example a ball joint or cardan joint, allowing said control column 2A or 2B to tilt about its axes of tilt X—X and Y—Y;

a tilt sensor 4A or 4B detecting, by means of a link rod 5A or 5B, the tilting of the control column 2A or 2B about the axis X—X to either side of the position of rest along Z—Z, and delivering an electrical signal which is a function of the amplitude of said tilting;

a tilt sensor 6A or 6B detecting, by means of a link rod 7A or 7B, the tilting of the control column 2A or 2B about the axis Y—Y, to either side of the position of rest along Z—Z, and delivering an electrical signal which is a function of the amplitude of said tilting;

mechanical means 8A or 8B generating resistance to tilting, when said control column 2A or 2B is tilted about the axis X—X;

mechanical means 9A or 9B generating resistance to tilting, when said control column 2A or 2B is tilted about the axis Y—Y, it being possible for said mechanical means 8A, 8B, 9A and 9B to be produced for example, in the form of spring links, leaf springs or sprung scissor stays; and a central unit UC connected by links 10A, 10B, 11A and 11B to the sensors 4A, 4B, 6A and 6B respectively, that receive the electrical signals generated by said sensors 4A, 4B, 6A and 6B, and which on the basis of these electrical signals calculates commands for the control members, for example the control surfaces, not depicted, of the aircraft, and transmitting said commands to said control members via a link 12.

The coupling system 1 in accordance with the invention is applied to said control device DC of a known type, described earlier.

According to the invention, said coupling system 1 comprises:

for each of said control columns 2A or 2B, operating members 13A and 14A or 13B and 14B capable of making said control column 2A or 2B respectively tilt about the axes of tilting X—X and Y—Y depending on the tilt commands received electrically; and a calculation unit CAL, capable of being activated and deactivated, receiving information relating to the position of tilt of said control columns 2A and 2B and generating, when activated, when at least one of said control columns 2A and 2B is operated (tilted), tilt commands which are transmitted electrically to the operating members of the other control column 2A and 2B.

According to the invention, said operating members 13A, 13B, 14A and 14B, which are controlled by the calculation unit CAL, via links 15A, 15B, 16A and 16B respectively, may each be produced in the form:

of a geared motor unit; or of an electric motor without gearing.

As is known, said operating members 13A, 13B, 14A and 14B are controlled by means of electronic regulation, of the usual type, not depicted.

In the embodiments depicted in FIGS. 1 and 2, said calculation unit CAL, produced in the form of a separate unit, receives the information relating to the position of tilt of the control columns 2A and 2B from the central unit UC via a link 17.

Said calculation unit CAL may, however, be produced in a different way, in particular:

it may be incorporated into the central unit UC; or it may be connected directly to the sensors 4A, 4B, 6A and 6B and therefore be independent of said central unit UC.

It will be noted that the calculation unit CAL, and therefore the coupling system 1, may be deactivated:

either manually, by one of the operators;

or automatically, via a means, not depicted, for example depending on the value of measured parameters.

Thus, the coupling system 1 can be activated either just for some phases of the flight, or for the entire flight.

According to the invention, said calculation unit CAL, in the embodiment of FIG. 1, controls the operating members 13A, 13B, 14A and 14B in such a way that:

when just one of said control columns 2A or 2B is tilted about an axis of tilting X—X or Y—Y into a first tilted position, the operating member of the other control column, relative to the same axis of tilting, is commanded so as to bring this column into a second position of tilting, the amplitude of tilting of which is equal to the amplitude of tilting of said first tilted position, multiplied by a coefficient; and when both control columns 2A and 2B are tilted simultaneously, each operating member is commanded so as to generate in the associated control column a resistance to tilting, the value of which is a function of the amplitude of tilting of the other control column.

According to the invention, when just one column is operated or tilted, said coefficient may:

be equal to 1, so as to obtain faithful mimicking by the control column that is not operated;

be less than 1, so that the control column that is not operated follows the movement of the control column that is operated, but with a smaller amplitude of tilting; or be greater than 1, so as to obtain mimicking with a greater amplitude of tilting.

In another embodiment, as depicted in FIG. 2, the calculation unit CAL commands the operating members 13A, 13B, 14A and 14B in such a way that:

when just one of said control columns 2A or 2B is operated, the command is identical to the command in the embodiment of FIG. 1;

when both control columns 2A and 2B are operated simultaneously, the operating members 13A, 13B, 14A and 14B are commanded in such a way as to bring said control columns 2A and 2B into identical positions of tilt, where the amplitude of tilting depends on the respective forces applied by the operators to said control columns 2A and 2B.

In this case, said coupling system 1 additionally comprises load sensors 18A and 18B associated respectively with the control columns 2A and 2B and capable of measuring the force applied by an operator to the corresponding control column and of transmitting said measurements to the central unit UC via links 19A and 19B respectively.

According to the invention, in this case, said coupling system 1 is deactivated when the force applied to one of said control columns 2A or 2B and measured by the associated load sensor 18A and 18B exceeds a predefined value.

Thus, by virtue of the invention, a particularly effective "active" coupling system is obtained.

What is more, in the event of a breakdown in said coupling system 1 which works electrically, the force sensation created by the mechanical means 8A, 8B, 9A and 9B which are independent of the calculation unit CAL and of the operating members 13A, 13B, 14A and 14B is maintained.

The coupling system 1 may also have a damping function. To achieve this:

said system 1 comprises speed sensors capable of measuring the rate of tilt of the control columns 2A and 2B about the axes X—X and Y—Y. The sensors 4A, 4B, 6A and 6B may perform this function; and the calculation unit CAL, when at least one of said control columns 2A or 2B is tilted about an axis X—X or Y—Y, commands the corresponding operating member 13A, 13B, 14A or 14B in such a way as to generate a resistance to tilting, the value of this being a function of the measured rate of tilting. This embodiment allows a complex damping function to be produced.

This damping function may, however, also be employed by an independent damping means, for example a hydraulic or friction damper of the usual type like the known damping means 20A, 20B, 21A and 21B depicted in FIGS. 1 and 2.

Of course, in a specific embodiment, said damping function may be provided in part by the calculation unit CAL and at least one operating member and one speed sensor, and in part by said independent damping means.

Of course, the coupling system 1 according to the invention may also be applied to an aircraft which has an automatic pilot.

In this case, said coupling system 1 comprises:

in a first alternative, priority-action means, not depicted, which keep the control columns 2A and 2B in a determined set position, preferably the neutral position along the axis Z—Z, when the aircraft is being controlled by said automatic pilot; and in a second alternative, means, also not depicted, which when the aircraft is being controlled by said automatic pilot, make said control columns 2A and 2B follow the tilting, with an amplitude that corresponds to said control.

What is claimed is:

1. A system for electrically coupling at least two control columns of a control device of a machine, said control columns being intended to be operated by separate operators and each being mounted so that it can tilt about at least one axis of tilting (X—X, Y—Y), said electrical coupling system comprising:

for each of said control columns, at least one tilt sensor delivering an electrical signal that is a function of the amplitude of tilting of said control column about its axis of tilting on either side of a neutral position;

for each of said control columns, at least one operating member capable of acting, in accordance with commands received electrically, on said control column; and calculation means receiving the electrical signals generated by said tilt sensors and capable of sending electrically, on the basis of said electrical signals, on the one hand, commands to control members of the machine and, on the other hand, commands to said operating members, wherein: for each of said control columns there is also at least one mechanical or hydraulic means generating resistance to tilting when said control column is tilted, the amount of resistance being a function of the amplitude of said tilting, so as to produce a force sensation function; said calculation means can be activated and deactivated for generating the commands for said operating members; said operating members are commanded only when said calculation means are activated; and the commands for one operating member associated with one of said control columns always depend on the tilted position of the other control column so that the force sensation function and the function of coupling the control columns are separate, the force sensation function being achieved purely mechanically by the action of said mechanical or hydraulic means and the coupling function being achieved electrically by the action of said operating members.

2. The coupling system as claimed in claim 1, wherein, when just one of said control columns is operated, in a first position of tilting, the operating member of the other control column is commanded to bring this operating member into a second position of tilting, the amplitude of tilting of which is equal to the amplitude of tilting of said first tilted position, multiplied by a determined coefficient.

3. The coupling system as claimed in claim 1, wherein when said control columns are operated simultaneously, each operating member is commanded so that a resistance to the tilting, with a value that is a function of the amplitude of tilting of the other control column is generated in the associated control column.

4. The coupling system as claimed in claim 1, wherein when said control columns are operated simultaneously, said operating members are commanded in such a way as to bring said control columns into identical positions of tilting, the amplitude of tilting of which is a function of the respective forces applied by the operators to said control columns.

5. The coupling system as claimed in claim 4, wherein, for each of said control columns there is at least one load sensor capable of measuring the force applied by one operator to said control column; and said coupling system is deactivated when the force applied to one of said control columns exceeds a predefined value.

6. The coupling system as claimed in claim 1, wherein said operating member is an electric motor.

7. The coupling system as claimed in claim 1, wherein said operating member is a geared motor unit.

8. The coupling system as claimed in claim 1, wherein said calculation means comprise a calculation unit which generates the commands for said operating members and a central unit which generates the commands for said control members of the machine.

9. The coupling system as claimed in claim 8, wherein said calculation unit receives information relating to the position of tilting of the control columns directly from said tilt sensors.

10. The coupling system as claimed in claim 8, wherein said calculation unit receives information relating to the position of tilting of the control columns from said central unit.

11. The coupling system as claimed in claim 1, wherein there is at least one speed sensor associated with one of said control columns and capable of measuring the rate of tilt of said control column; and the operating member associated with said control column is commanded, when it tilts, in such a way as to generate resistance to tilting, the value of this resistance being a function of the rate of tilt measured by said speed sensor.

12. The coupling system as claimed in claim 1, wherein there is at least one independent damping means associated with one of said control columns.

13. The coupling system as claimed in claim 1 for a machine that can be controlled by an automatic pilot, wherein there are priority-action means which keep the control columns in a determined set position when said machine is being controlled by said automatic pilot.

14. The coupling system as claimed in claim 1 for a machine that can be controlled by an automatic pilot, wherein there are means which, when said machine is being controlled by said automatic pilot, make said control columns follow the tilting with amplitude that corresponds to said control.

* * * * *